UNITED STATES PATENT OFFICE.

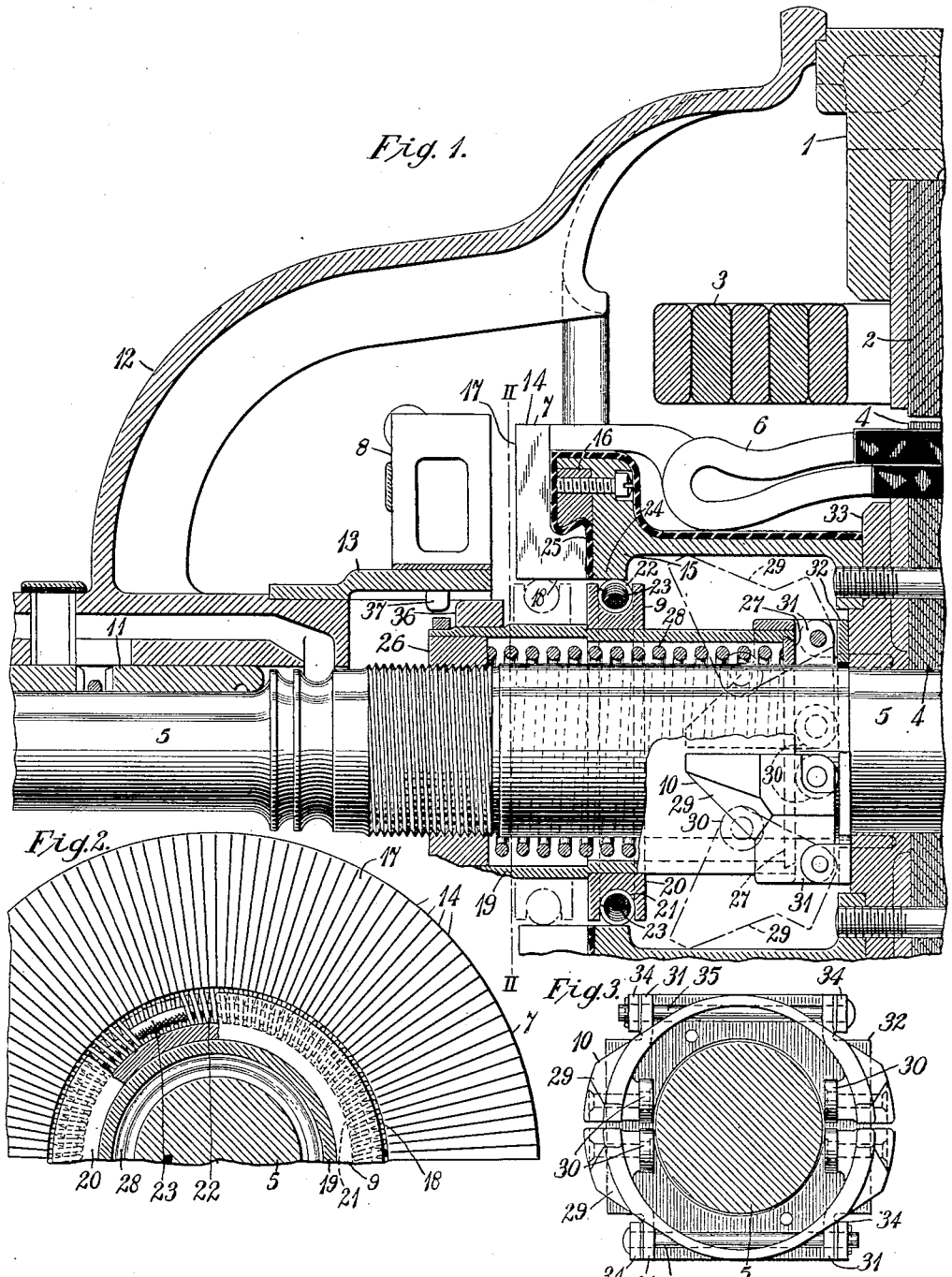

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

SINGLE-PHASE MOTOR.

1,090,328. Specification of Letters Patent. Patented Mar. 17, 1914.

Application filed May 27, 1912. Serial No. 700,016.

*To all whom it may concern:*

Be it known that I, CHESTER B. MILLS, a citizen of the United States, and a resident of East McKeesport, in the county of Allegheny and State of Pennsylvania, have invented a new and useful Improvement in Single-Phase Motors, of which the following is a specification.

My invention relates to dynamo-electric machines and it has special reference to single-phase motors of the commutator type.

One object of my invention is to provide a particularly advantageous mechanical structure for motors of the class above indicated.

Another object of my invention is to provide a simple and effective device for short circuiting the commutator of such a motor, and an automatic governor for said device, whereby the starting characteristics of a series motor and the operating characteristics of a squirrel-cage induction motor may be secured.

Single phase electric motors have heretofore been provided with commutators, and adapted to start as series motors and to operate as squirrel-cage induction motors, automatic means having been provided for short circuiting the commutator bars when the motor speeds attained predetermined values. Considerable difficulty has, however, been encountered in attempting to produce a satisfactory short-circuiting device and a suitable centrifugal governor therefor.

According to my present invention, I provide a particularly effective and reliable short circuiting device and a centrifugal governor for actuating the same which occupy a very small space in the motor and possess other advantages which are hereinafter pointed out.

Figure 1 of the accompanying drawings, is a sectional elevation of a portion of a dynamo-electric machine embodying my invention. Fig. 2 is a sectional view, on the line II—II of Fig. 1, and Fig. 3 is an elevation of the centrifugal governor of Fig. 1, looking in an axial direction.

Referring to the drawings, the motor here shown comprises a stationary frame 1 which supports a stationary core member 2, a stator winding 3 associated with the core member 2, a movable core member 4 mounted on a shaft 5, a rotor winding 6, a commutator cylinder 7, brush holders 8, a short circuiting device 9 and a centrifugal governor 10. The shaft 5 is rotatively supported by end brackets 12 which are provided with bearings 11 in a well known manner and form a part of the stationary frame 1. Only one of the end brackets and its accessories is illustrated. The brush holders 8 (only one of which is shown) are supported on a stationary sleeve 13 which is secured to the end bracket 12 and is concentric with the shaft 5. The commutator cylinder 7 is composed of a plurality of substantially L-shaped commutator segments or bars 14 which are secured to a stationary sleeve 15 by means of a clamping ring 16. The commutator cylinder has a plane surface 17 which is substantially perpendicular to the axis of the shaft 5 and is engaged by suitable brushes (not shown) supported in the brush holders 8, and a cylindrical surface 18 which is adapted to be engaged by the short circuiting device 9.

A movable sleeve 19 loosely surrounds the shaft 5 directly within the commutator cylinder 7 and supports a ring 20 which forms a part of the short circuiting device 9 and has an annular groove 21. The short circuiting device further comprises a helical spring 22 which is bent into the form of a ring, and is mounted in the groove 21 of the ring 20. A flexible conductor or cable 23 is threaded through the spring 22, which I have designated as a garter spring, and is adapted to short circuit the several turns thereof. The cable 23 may be a braided tubular member constructed of copper and corresponding to the usual pigtail conductors or shunts which are used for connecting the brushes of dynamo-electric machines to their holders, but any other suitable short circuiting conductor of relatively low resistance may be employed.

The stationary sleeve 15 has a shoulder 24, the inner cylindrical surface of which forms a continuation of the cylindrical surface 18 of the commutator 7, suitable insulation 25 being, of course, interposed.

The shaft 5 is provided with a nut 26 which fits into the outer end of the movable sleeve 19 and forms a guide for this member. The sleeve 19 is provided with an inwardly extending flange 27 at its opposite end, which brings it into contact with the shaft at this point, and a helical compression spring 28 surrounds the shaft within the sleeve between the nut 26 and the flange 27.

The governor 10 is composed of two similar semi-circular pawls 29, having rollers 30 and perforated projections 31. The pawls are pivotally supported on a bracket 32 which is secured to an end ring 33 of the rotating part of the motor and is provided with lugs 34 which extend in an axial direction toward the commutator end of the motor shaft. Pins 35 extend through the perforated projections 31 and the lugs 34 and provide a pivotal support for each of the pawls.

The rollers 30 of the pawls 29 engage the end flange 27 of the sleeve 19 and when the motor is at rest or is operating at slow speeds, the spring 28 forces the sleeve 19 inwardly, holding the parts in positions shown in full lines in Fig. 1 of the drawings. It will be observed that, in this position, the short circuiting device is so located that the garter spring 22 is in contact with the cylindrical surfaces of the shoulder 24. When the speed of the motor attains a predetermined value, the pawls 29, by reason of centrifugal action, assume positions shown in broken lines in Fig. 1, and, subsequently, force the sleeve 19 outwardly in opposition to the spring 28 until the short circuiting device occupies the position shown in broken lines in Fig. 1, and the garter spring 22 engages the cylindrical surface 18 of the commutator 7. The turns of the spring in this position interconnect the commutator bars and short circuit the commutator cylinder. In this connection, the shunt 23 is of particular importance since its flexibility and weight enable it to expand and press firmly against the turns of the garter spring in response to the centrifugal forces to which it is subjected. The shunt, therefore, materially reduces the current which would otherwise traverse the spring and would be likely to detract from its resiliency or otherwise injure it.

Since the spring is always acting on the surface of a cylinder, it is not called upon to expand and contract and is particularly free from deterioration.

The sleeve 19 is preferably provided with a ring or enlargement 36 which is adapted to engage an inwardly projecting finger 37 on the brush holder 8 when the short circuiting device is acting upon the commutator cylinder. The finger 37 then serves to remove the pressure from the brushes in a well known manner.

My invention is not restricted for use with a motor or dynamo-electric machine of any particular type, and structural variations may be effected within its scope. I therefore, desire to be limited only by the appended claims.

I claim as my invention:

1. A short-circuiting device for electrical apparatus comprising a garter spring having a shunt comprising a tubular member of low-resistance conducting material inclosed within it.

2. A short-circuiting device for electrical apparatus comprising a ring having a circumferential groove, a garter spring disposed in the groove and having a shunt comprising a braided member of low-resistance conducting material inclosed within it.

3. A dynamo-electric machine comprising a commutator cylinder, a ring having an annular groove, a garter spring located in the groove and interposed between the ring and the cylinder and a relatively low-resistance short circuiting shunt comprising a braided tubular member inclosed within the garter spring.

4. In a dynamo-electric machine, the combination with a commutator cylinder, a relatively stationary member insulated therefrom and having a cylindrical surface forming a continuation of the surface of the commutator, of a short-circuiting device comprising a ring having an annular groove, a helical spring bent into the form of a ring and disposed in the annular groove between the ring and the cylindrical surface adjacent to the commutator cylinder, and automatic means comprising a pivotally mounted weighted member dependent upon the speed of the machine for so adjusting the short-circuiting device as to move the spring into engagement with the commutator cylinder.

5. A short-circuiting device for electrical apparatus comprising a garter spring and an expansible conducting shunt comprising a braided tubular member inclosed within it.

6. A dynamo-electric machine comprising a commutator cylinder, a short-circuiting device comprising a garter spring and an expansible conducting shunt comprising a braided tubular member inclosed within it, and means dependent upon the speed of the machine for automatically moving the short-circuiting device in an axial direction into and out of engagement with the commutator cylinder.

7. A dynamo-electric machine comprising a commutator cylinder, a ring having an annular groove, a garter spring located in the groove and interposed between the ring and the cylinder, and a relatively low-resistance expansible short-circuiting shunt comprising a tubular member inclosed within the garter spring.

8. In a dynamo-electric machine, the combination with a commutator cylinder, a relatively stationary member insulated therefrom and having a cylindrical surface forming a continuation of the surface of the commutator, of a short-circuiting device comprising a ring having an annular groove, a helical spring bent into the form of a ring and disposed in the annular groove between the ring and the cylindrical surface adjacent to the commutator cylinder, a flexible low-resistance shunt conductor inclosed within the spring and susceptible of expansion under centrifugal action to firmly engage the turns of the spring, and automatic means comprising a pivotally mounted weighted member dependent upon the speed of the machine for so adjusting the short-circuiting device as to move the spring into engagement with the commutator cylinder.

In testimony whereof, I have hereunto subscribed my name this 11th day of May 1912.

CHESTER B. MILLS.

Witnesses:
H. F. George,
B. B. Hines.